(12) United States Patent
Mueck et al.

(10) Patent No.: US 8,977,254 B2
(45) Date of Patent: Mar. 10, 2015

(54) METHOD FOR DEVICE CONFIGURATION, DATABASE, MOBILE COMMUNICATION DEVICE AND NETWORK ENTITY

(71) Applicants: Intel Corporation, Santa Clara, CA (US); Intel Mobile Communications GmbH, Neubiberg (DE)

(72) Inventors: Markus Mueck, Unterhaching (DE); Srikathyayani Srikanteswara, Portland, OR (US); Reza Arefi, Great Falls, VA (US); Vladimir Ivanov, St. Petersburg (RU)

(73) Assignees: Intel Corporation, Santa Clara, CA (US); Intel Mobile Communications GmbH, Neubiberg (DE)

( * ) Notice: Subject to any disclaimer, the term of this patent is extended or adjusted under 35 U.S.C. 154(b) by 52 days.

(21) Appl. No.: 13/707,649

(22) Filed: Dec. 7, 2012

(65) Prior Publication Data

US 2014/0162617 A1 Jun. 12, 2014

(51) Int. Cl.
*H04W 24/00* (2009.01)
*H04W 8/24* (2009.01)

(52) U.S. Cl.
CPC .................................... *H04W 8/245* (2013.01)
USPC ........... 455/423; 455/418; 455/425; 455/419; 455/509

(58) Field of Classification Search
CPC ............ H04W 16/14; H04W 72/1215; H04W 72/082

USPC .......................... 455/418, 423, 425, 419, 509
See application file for complete search history.

(56) References Cited

U.S. PATENT DOCUMENTS

| | | | | |
|---|---|---|---|---|
| 2008/0037413 | A1* | 2/2008 | Gu et al. ........................ | 370/210 |
| 2012/0120887 | A1* | 5/2012 | Deaton et al. ................. | 370/329 |
| 2012/0190401 | A1* | 7/2012 | Makabe ........................ | 455/525 |
| 2012/0195207 | A1* | 8/2012 | Mueck et al. ................. | 370/252 |
| 2012/0269159 | A1* | 10/2012 | Inoue et al. ................... | 370/329 |
| 2013/0150106 | A1* | 6/2013 | Bucknell et al. ............. | 455/501 |
| 2014/0023022 | A1* | 1/2014 | Cheng et al. ................. | 370/329 |
| 2014/0080535 | A1* | 3/2014 | Gauvreau et al. ............. | 455/513 |
| 2014/0122688 | A1* | 5/2014 | Partida ........................ | 709/224 |

OTHER PUBLICATIONS

Radio Spectrum Policy Group 2011, Report on CUS and other spectrum sharing approaches "Collective Use of Spectrum", Oct. 2011.
Report on Study of the ASA (Authorized Shared Access) concept, CEPT WG FM, 2012.

(Continued)

*Primary Examiner* — Barry Taylor
(74) *Attorney, Agent, or Firm* — Schwabe, Williamson & Wyatt, P.C.

(57) ABSTRACT

A method for device configuration is described comprising storing information about whether a mobile communication system comprising a mobile communication device operates correctly when a configuration is applied in a context of a configuration history to the mobile communication device; receiving a request for a configuration to be applied to mobile communication devices; and determining a configuration to be applied to the mobile communication devices based on the stored information.

21 Claims, 7 Drawing Sheets

(56) References Cited

OTHER PUBLICATIONS

Cloud Spectrum Services, INTEL White Paper, presented at ETSI RRS standardization, May 2012.

New Work Item (NWI) to develop a System Reference Document (SRDoc) for mobile broadband services in the 2300-2400 MHz band under Licensed Shared Access regime, ETSI RRS, Document No. RRS(12)018018, May 2012.

* cited by examiner

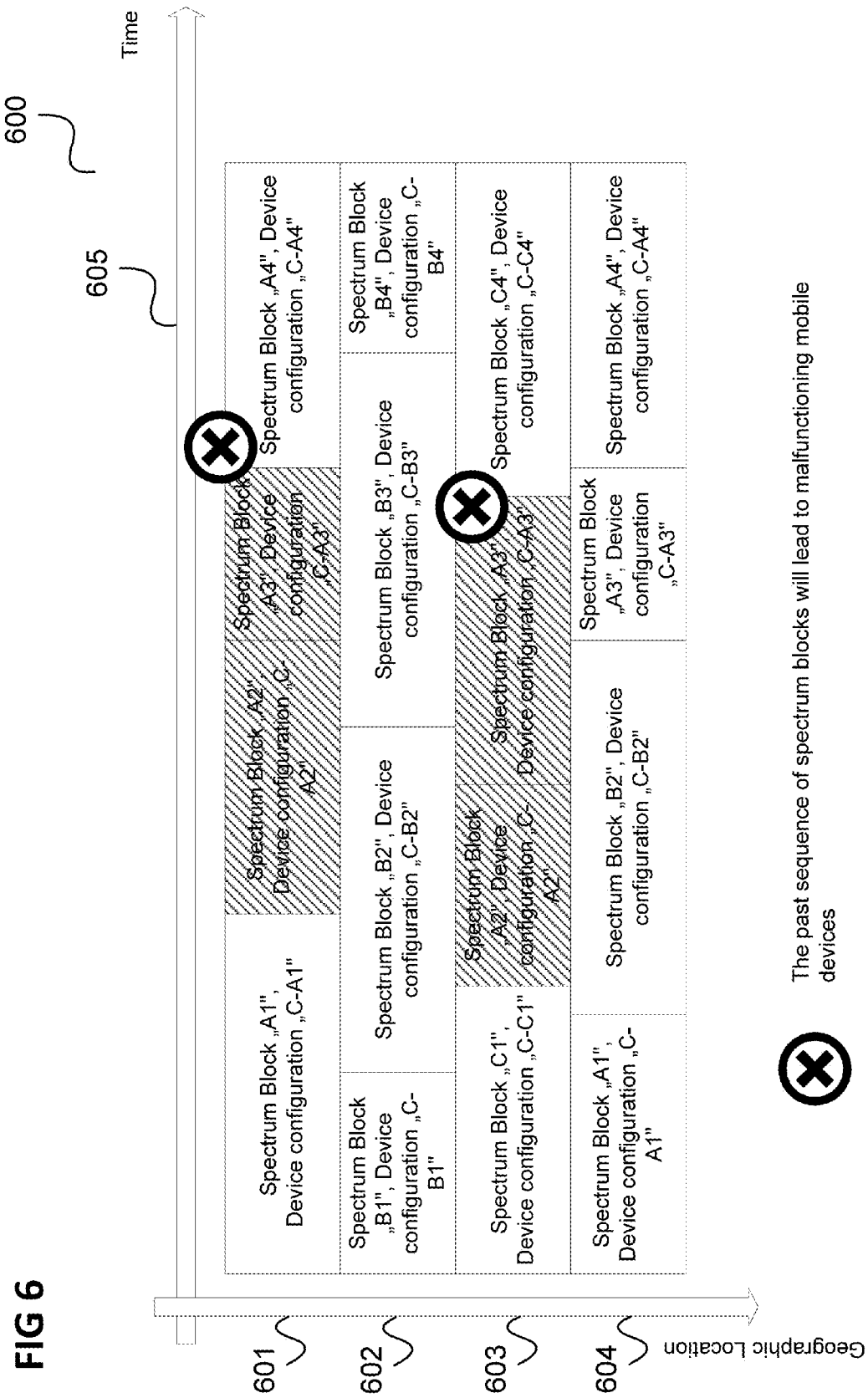

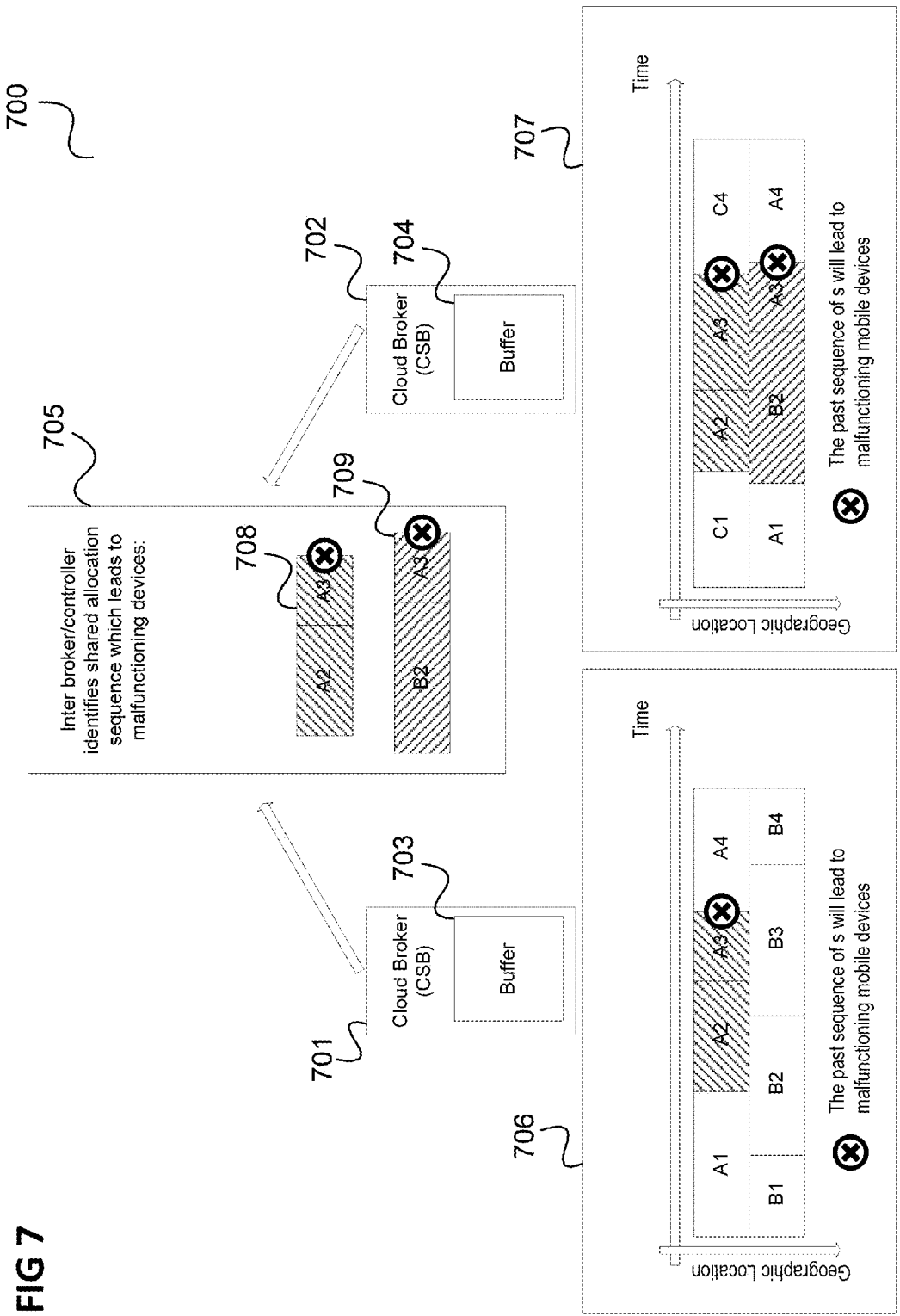

US 8,977,254 B2

METHOD FOR DEVICE CONFIGURATION, DATABASE, MOBILE COMMUNICATION DEVICE AND NETWORK ENTITY

TECHNICAL FIELD

The present disclosure relates to methods for device configuration, databases, mobile communication devices and network entities.

BACKGROUND

With the growing number of electronic device using mobile communication, frequency spectrum has become a scarce resource and concepts are development for an efficient usage of frequency spectrum. The LSA (Licensed Shared Access) concept was recently developed by RSPG (Radio Spectrum Policy Group) on an European level. There is a need for a new way for answering to the operators' needs for more spectrum. Indeed, it is expected that no more dedicated spectrum will be available for cellular operators for mobile communications in the future. LSA thus proposes mechanisms for introducing shared spectrum based solutions such that mobile cellular operators have access to additional licensed spectrum from other licensees (like public safety, government. etc) which they normally would not get access to. However, spectrum sharing requires that mobile communication device are able to handle communication using many spectrums and spectrum combinations or sequences. Approaches to avoid malfunctioning in such a scenario and generally in scenarios with a multitude of possible mobile communication device configurations and configuration combinations are desirable.

SUMMARY

A method for device configuration is provided including storing information about whether a mobile communication system including a mobile communication device operates correctly when a configuration is applied in a context of a configuration history to the mobile communication device; receiving a request for a configuration to be applied to mobile communication devices; and determining a configuration to be applied to the mobile communication devices based on the stored information.

Further, a database having a memory storing the information, a mobile communication device including such a database, a network entity including such a database and a network entity determining a mobile communication device configuration based on such information are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 6 shows a spectrum allocation diagram including mobile device configurations.

FIG. 7 shows a communication arrangement including a plurality of spectrum brokers/controllers.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
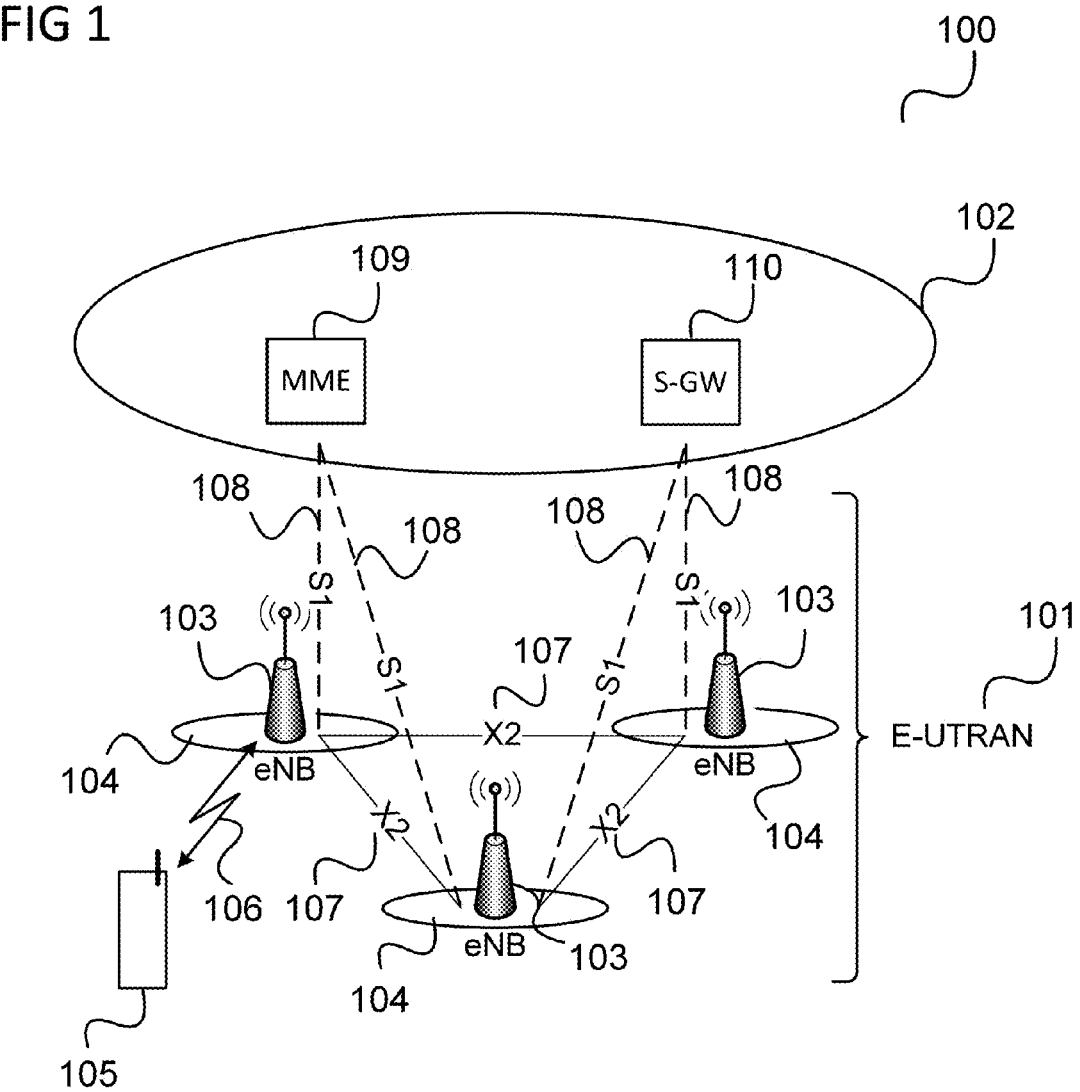
FIG. 1 shows a communication system.

FIG. 1 shows a communication system 100.

The communication system 100 is a mobile communication network, e.g. a cellular mobile communication system (also referred to as cellular radio communication network in the following), including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW can 109, 110 be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

In case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:

Functions for Radio Resource Management: Radio Bearer Control, Radio Admission Control, Connection Mobility Control, dynamic allocation of resources to UEs 105 in both uplink and downlink (scheduling);

IP header compression and encryption of user data stream;

Selection of an MME 109 at UE 105 attachment when no routing to an MME 109 can be determined from the information provided by the UE 105;

Routing of User Plane data towards Serving Gateway (S-GW) 110;

Scheduling and transmission of paging messages (originated from the MME);

Scheduling and transmission of broadcast information (originated from the MME 109 or O&M (Operation and Maintenance));

Measurement and measurement reporting configuration for mobility and scheduling;

Scheduling and transmission of PWS (Public Warning System, which includes ETWS (Earthquake and Tsunami Warning System) and CMAS (Commercial Mobile Alert System)) messages (originated from the MME 109);

CSG (Closed Subscriber Group) handling.

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located (and on which it is camping). If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

For the communication between the base station and the mobile terminal 105 communication resources in the form of frequency spectrum is required. With the growing number of electronic device using mobile communication, frequency spectrum has become a scarce resource and concepts are development for an efficient usage of frequency spectrum.

The LSA (Licensed Shared Access) concept was recently developed by RSPG (Radio Spectrum Policy Group) on an European level. The objective is to propose a new way for answering to the operators' needs for more spectrum. Indeed, it is expected that no more dedicated spectrum will be available for cellular operators for mobile communications in the future. LSA thus proposes mechanisms for introducing shared spectrum based solutions such that mobile cellular operators have access to additional licensed spectrum from other licensees (like public safety, government. etc) which they normally would not get access to.

LSA is based on a similar concept which is called ASA (Authorized Shared Access). ASA, however, is limited to IMT (International Mobile Telecommunications) spectrum while LSA is also addressing non-IMT bands. Both LSA and ASA currently exist on a rather conceptual level and no detailed technical implementation is available at this time.

A related technology is called CSS (Cloud Spectrum Services). It addresses the same framework as LSA and ASA but introduces more detailed implementation solutions.

On a regulatory level, there is massive interest for LSA, ASA and CSS, in particular in Europe. Indeed, CEPT (Conférence Européenne des Administrations des Postes et des Télécommunications) WG FM (Working Group Frequency Management) has agreed to launch a corresponding project team in September 2012. ETSI (European Telecommunications Standards Institute) RRS (Reconfigurable Radio Systems) has agreed on the set-up of a so-called SRDoc (System Reference Document) in May 2012, which is the official way for ETSI to cooperate with regulatory bodies. Indeed, this SRDoc will allow industry to officially provide inputs and requirements related to CEPT work on LSA, ASA and CSS.

This SRDoc targets in particular the 2.3-2.4 GHz Band which is expected to be one of the most straightforward candidates for shared spectrum usage. This is also acknowledged by CEPT WG FM.

In accordance with LSA, ASA and CSS it can be expected that mechanisms for enabling mobile devices (MDs), e.g. mobile terminals, to use shared spectrum are introduced. Following the CSS concept the spectrum may be allocated based on various time-scales, ranging from a rather static up to a highly dynamic allocation of shared spectrum.

Mobile devices such as cell phones for such a dynamically changing spectrum access environment are practically impossible to be tested at the full extent. Too many different spectrum allocation scenarios are expected to be possible, which will presumably enable manufacturers to only validate a limited number of basic scenarios. With CSS, mobile devices might have to operate dynamically in bands other than what they are certified for. These other bands (e.g. referred to as CSS bands) might have regulatory requirements quite different from that of cellular bands (i.e. bands licensed for mobile communication networks). For instance, maximum transmitter power, out of band emissions, etc., could be different. These bands could dynamically become available and unavailable in short or long periods of time. It can be expected to be impractical to have all mobile devices be certified for all possible CSS bands.

Therefore, it can be expected that it may occur that some (rare, untested) configurations (which may also depend on the past reconfiguration steps, i.e. the reconfiguration history) may lead to a malfunction of certain types of mobile devices. For the operator detecting and isolating malfunctioning devices is typically of critical importance since unwanted emissions in certain spectrum bands may lead to the operator's license being revoked or other serious consequences. Furthermore, the dynamic allocation (and removal) of bands to be used for spectrum sharing may indeed lead to interference events (or other undesired operational states) which occur unexpectedly.

To give an example, dynamic allocation (and removal) of bands may lead to challenging set-ups for dealing with cross-border issues. Indeed, neighboring countries may decide independently on the dynamic allocation (and removal) of bands and guaranteed interference avoidance may require complex political and administrative processes that are not planned for an initial roll-out of the technology. In this context, it is desirable to be able to track the behavior of any mobile devices and network equipment in order to identify the specific circumstances under which the interference event (or similar) has occurred.

As described in the following, approaches are described which may i) make a mobile communication system aware of LSA/ASA/CSS based configuration possibilities (such as available spectrum for shared usage, time constraints, RF parameter constraints, etc.), including past configuration possibilities and ii) introduce mechanisms that help to detect and prevent LSA/ASA/CSS based configurations which may lead to unexpected events such as interference, etc.

Figure 2:
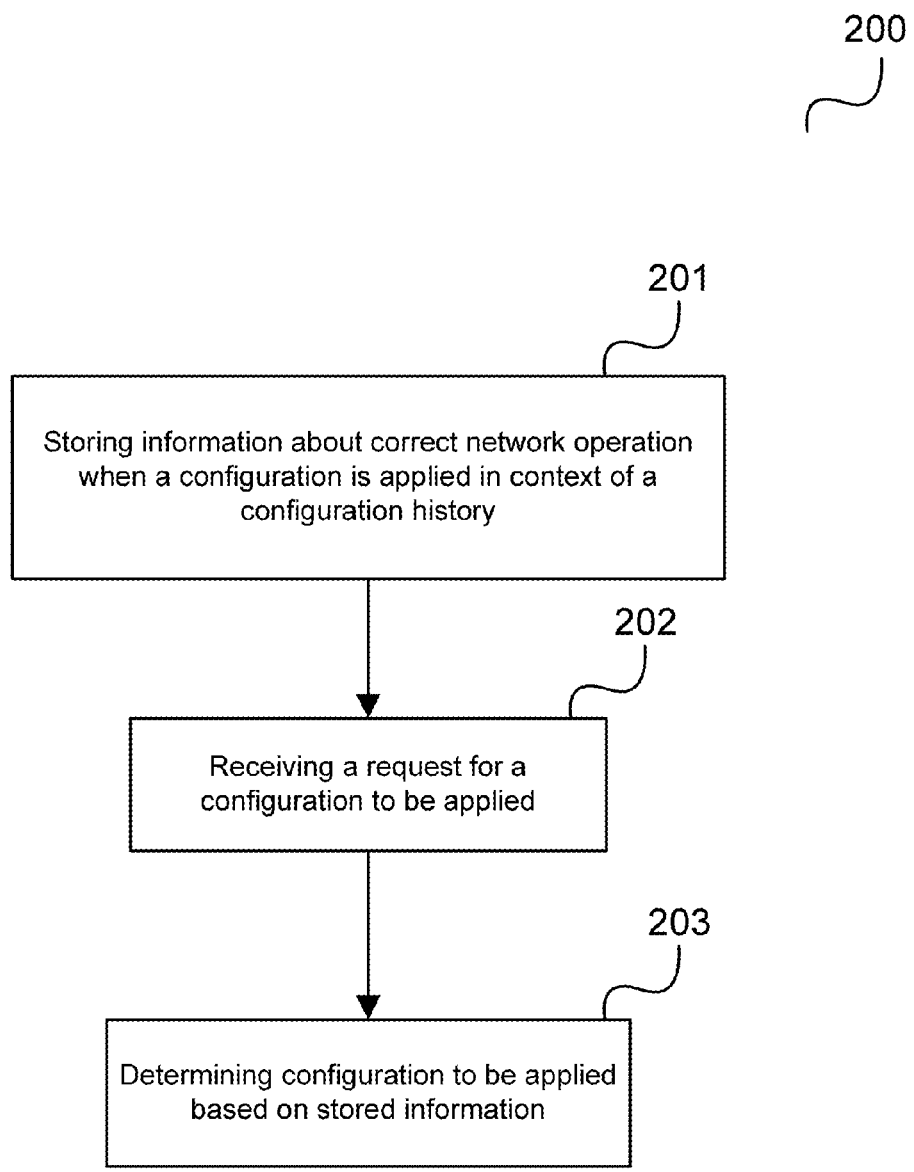
FIG. 2 shows a flow diagram illustrating a method for device configuration.

FIG. 2 shows a flow diagram 200.

The flow diagram 200 illustrates a method for device configuration.

In 201, a memory stores information about whether a mobile communication system including a mobile communication device operates correctly when a configuration is applied to the mobile communication device in a context of (e.g. based on) a configuration history (e.g. in context of an earlier or past configuration).

In 202, a receiver receives a request to apply a configuration to be applied to mobile communication devices (e.g. the mobile communication devices in a predetermined geographic area, e.g. a coverage area of a mobile communication network). In 203, a determiner determines a configuration to be applied to the mobile communication devices based on the stored information.

In other words, a database stores information whether mobile communication devices (e.g. mobile terminals) function correctly for a certain sequence of allocated of configurations and based on this information an entity decides which configurations to apply or which configurations not to apply, e.g. for mobile communication in a certain geographical area.

A configuration (or the application of a configuration) may be for example allocation of a spectrum (band) combination, usage of a Radio Access Technology (RAT) sequence within a given spectrum, allocation of a band sequence within a certain spectrum and within a single RAT or consecutive different RATs, allocation of different spectrums applied at the same time (carrier aggregation or RAT aggregation like WLAN/cellular at the same time).

It should be noted that parts of the method illustrated in FIG. 2 may or may not be carried out automatically, e.g. by a circuit. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

It should further be noted that 201 to 203 may be carried out by different entities, e.g. different computer systems of components of different networks. For example the information may be stored by a database in the network or also in a mobile device memory and the determining may be carried out by a network component.

The method illustrated in FIG. 2 allows for example avoiding malfunctioning mobile devices in a spectrum sharing (e.g. LSA/ASA/CSS) context, i.e. in a context where the configuration (or application of a configuration) is spectrum allocation for usage by mobile communication devices. For example, it may be avoided that a malfunctioning device or any other malfunctioning network (management) entity creates interference with other radio services and disrupts the communication quality for a large number of users.

The information for example indicates whether a mobile communication system including a mobile communication device operates correctly when a configuration is applied to the mobile communication device in a context of a (e.g. based on) a configuration history for communication by means of the mobile communication system.

The method may include storing the information depending on a characteristic (e.g. a type) of the mobile communication device. For example, it may be stored that mobile communication devices of a certain type operate correctly (or that mobile communication devices malfunction) when using a first spectrum and a second spectrum consecutively, wherein the type may for example be a mobile terminal brand, a mobile terminal model, mobile terminals with certain capabilities (or lack of certain capabilities). The first spectrum and the second spectrum being allocated consecutively may be understood as the first spectrum and the second spectrum being allocated in sequence. This may include the usage of gaps in between the allocation of the two spectrums or even the allocation of a third spectrum between the allocation of the first spectrum and the second spectrum.

The characteristic of the mobile communication device may also include a version of software running on the mobile communication device (or a date of a software update), a version of the device's firmware etc. A malfunction for a configuration in context of a configuration history may for example be stored to be device specific and/or type specific. Further, the information may be different for specific mobile communication devices and mobile communication devices of a certain type in general.

For example, it could be stored (e.g. in a database) that a specific mobile communication device does not work with a certain configuration history whereas the mobile communication devices of same type usually (or in most other cases) work properly.

The configuration for example includes an allocation of a spectrum to the mobile communication device and the configuration history includes a past allocation of a spectrum to the mobile communication device.

For example, the information is about whether the mobile communication system operates correctly when a first frequency spectrum and a second frequency spectrum are consecutively allocated to the mobile communication device.

In other words, a database stores information whether mobile communication devices (e.g. mobile terminals) function correctly for a certain sequence of allocated spectrums and based on this information an entity that allocates spectrum decides which spectrum to allocate or which spectrum to not allocate for mobile communication in a certain geographical area.

The information for example indicates whether a mobile communication system including a mobile communication device operates correctly when the first frequency spectrum is allocated to the mobile communication device after the second frequency spectrum to the mobile communication device.

For example, the spectrum to be allocated is to be allocated in a predetermined geographic area after another spectrum that has been allocated in the predetermined geographic area and the method for example includes determining the spectrum such that according to the information, a mobile communication system operates correctly when the spectrum and the other spectrum are consecutively allocated to a mobile communication device of the mobile communication system.

The request is for example a request to apply a configuration to mobile communication devices in a predetermined geographic area and the method for example includes determining the spectrum such that according to the information, a mobile communication system operates correctly when the spectrum and another spectrum which is allocated for usage by mobile communication devices in another geographic area neighboring the predetermined geographic area are consecutively allocated to a mobile communication device of the mobile communication system. For example, it is ensured that mobile devices function correctly when using a spectrum sequence (or generally a sequence of configurations) arising from a transition between two geographic areas. For example, it is ensured that spectrums are allocated to neighboring geographic areas such that mobile devices work correctly when using the allocated spectrums consecutively.

The request for the spectrum is for example a request for unlicensed spectrum.

The request for the spectrum is for example a request for a spectrum shared between a primary user and a secondary user.

The request for the spectrum is for example a request for a spectrum shared between a plurality of mobile communication systems.

The method for example includes receiving the request for the spectrum from a mobile communication system and the request is for example a request to allocate a spectrum for usage by mobile communication devices of the mobile communication system and is a request for a spectrum that is not licensed by the operator of the mobile communication system. From the point of view of the operator, the request for a spectrum may be a request for a secondary spectrum which usage is limited for the operator and for example bound to certain conditions. Accordingly, the spectrum that is allocated in response to the request is not allocated permanently, e.g. for less than 10 years, i.e. the request is not answered with a license for the spectrum usage that basically reflects a temporary ownership.

The method for example includes receiving the request for the spectrum from a mobile communication system and the request is for example a request to allocate a spectrum for usage by mobile communication devices of the mobile communication system and is a request for a spectrum assigned to a holder of the spectrum, and in turn assigned by the holder of the spectrum to the operator of the radio communication system in contrast to the spectrum being assigned to an operator of the mobile communication system.

The request may for example indicate a candidate configuration to be applied to mobile communication devices and determining a configuration for example includes deciding whether to apply the candidate configuration.

In case that the application of a configuration is the allocation of a spectrum, it should be noted that deciding whether to allocate a candidate spectrum in the geographic area can be seen as determining to allocate a spectrum in the geographic area since for example deciding that to not allocate the candidate spectrum in the geographic area can be seen as determining to allocate a spectrum not including the candidate spectrum in the geographic area.

The method may further include, if it is decided to not apply the candidate configuration, determining to apply a different configuration than the candidate configuration as configuration (e.g. a different spectrum with the same RAT as in the candidate configuration, different RAT same spectrum as in the candidate configuration, different RAT and different spectrum than in the candidate configuration, different bands than according to the candidate configuration etc.).

The method may further include storing information that a mobile communication system including a mobile communication device operates correctly when the configuration is applied to the mobile communication device in a context of a (e.g. based on a) configuration history in case that mobile communication devices operated correctly when the configuration has been applied in a context of a (e.g. based on a) configuration history to the mobile communication devices since a predetermined point in time. In other words, a configuration is stored as being safe in context of a configuration history (i.e. mobile communication devices operate correctly when using the configuration in a context of a (e.g. based on a) configuration history) when mobile communication devices using the configuration in a context of a (e.g. based on a) the configuration history have correctly operated in the past, e.g. since a predetermined point in time or for a predetermined time period.

The method for example further includes receiving the request for the spectrum from a mobile communication system, the request including version information about a version or update date of the software or firmware or any other interchangeable parts of the mobile device and the request for example to allocate a spectrum for usage by the mobile communication device. Accordingly the decision which configuration to signal back to the mobile device to be applied by the mobile device or which spectrum to allocate to the device may be done taking into account the received version information. In case of a response that does not allow for the requested configuration or that does not allocate the requested spectrum, in addition to another or no configuration or spectrum signalled to the device the response to the device may include alternative version information that indicates a different version or different versions of software, firmware or any other interchangeable parts of the mobile device that, if applied by the mobile device, would allow the requested configuration or allocation of spectrum.

The method for example, further includes applying the determined configuration to mobile communication devices.

For example, the operator of a mobile communication network may receive on request a list of candidate spectrums, bands, RATs, and combinations etc. that could be applied to the mobile communication devices and the operator only then requests a specific portion of spectrum (from the list taking into account further criteria from the operator).

In case that the configuration (or the applying of the configuration) is a spectrum allocation, the allocation of the spectrum may for example be a long-term allocation (correspondingly, the request may be the request for a spectrum that is allocated on a long-term basis), e.g. a spectrum that the operator of the mobile communication system may allocate in the geographic area on a long-term basis (e.g. longer than a year but for example less than ten years). Alternatively, the allocation may be more dynamic and the spectrum may be allocated on a short-term basis (e.g. shorter than a year, e.g. in terms of days or even only hours or even shorter). In both cases the spectrum is for example a spectrum assigned to a holder of the spectrum and in turn assigned by the holder of the spectrum to the operator of the mobile communication system.

for example a request for a spectrum to be allocated for usage by mobile communication devices of the mobile communication system and is a request for a spectrum assigned from the regulatory authority to a holder of the spectrum, and in turn assigned by the holder of the spectrum to the operator of the radio communication network in contrast to the spectrum being assigned from a regulatory authority to an operator of the radio communication network.

It should be noted that even if a mobile communication system operator (e.g. a cellular network operator) receives an indication of a determined spectrum for usage by mobile communication devices in the geographic area the operator does not necessarily actually have to allocate it for mobile communication in the geographic area but may for example keep in reserve in case more resources are needed in the geographic area.

The request is for example a request for a configuration to be applied to mobile communication devices in a predetermined geographic area and determining the configuration for example includes determining a configuration to be applied to mobile communication devices in the predetermined geographic area based on the stored information.

Figure 3:
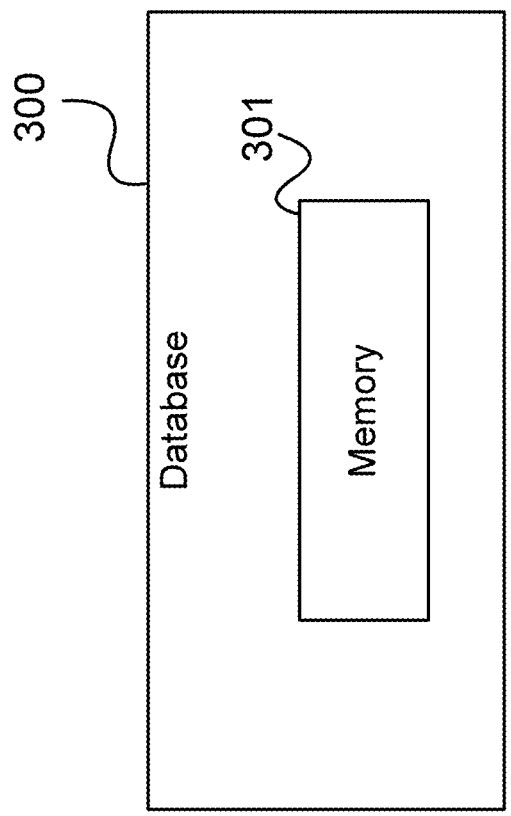
FIG. 3 shows a database.

The information is for example stored in a database as illustrated in FIG. 3.

FIG. 3 shows a database 300.

The database 300 includes a memory 301 storing information about whether a mobile communication system including a mobile communication device operates correctly when a configuration is applied in a context of a (e.g. based on a) configuration history to the mobile communication device.

The database may further include a receiver configured to receive a request for information whether to apply a predetermined configuration to mobile communication devices.

The database may further include a determiner configured to determine, based on the information, whether to apply the predetermined configuration to the mobile communication devices.

The database for example further includes a transmitter configured to respond to the request with an indication whether to apply the predetermined configuration to the mobile communication devices.

The request may include version information about a version or update date of the software or firmware or any other interchangeable parts of the mobile device and the request is for example a request to allocate a spectrum for usage by the mobile communication device. Accordingly the decision which configuration to signal back to the mobile device in the response by the transmitter to be applied by the mobile device or which spectrum to allocate to the device may be done taking into account the received version information. In case of a response that does not allow for the requested configuration or that does not allocate the requested spectrum, in addition to another or no configuration or spectrum signalled to the device the response to the device may include alternative version information that indicates a different version or different versions of software, firmware or any other interchangeable parts of the mobile device that, if applied by the mobile device, would allow the requested configuration or allocation of spectrum.

The receiver may further be configured to receive the information stored in the database.

The database is for example part of a mobile communication device.

Alternatively, the database is for example part of a network entity (i.e. a network component, for example a communication device, e.g. a spectrum broker/controller as described below) or the database may be a stand-alone entity.

A network entity (i.e. a network component, for example a communication device, e.g. a spectrum broker/controller as described below) may be provided including a receiver configured to receive a request for a configuration to be applied to mobile communication devices and a determiner configured to determine information about whether a mobile communication system including a mobile communication device operates correctly when a configuration is applied in a context of a (e.g. based on a) configuration history to the mobile communication device and configured to determine a configuration to be applied for usage by the mobile communication devices based on the stored information.

The determiner is for example configured to determine the information by requesting the information from a database.

It should be noted that embodiments described in context of the method illustrated in FIG. 2 are analogously valid for the database 300, the mobile communication device and the network entity and vice versa.

In the following, a example is described in which the configuration (or the applying of a configuration) is a spectrum allocation.

For example, an entity (e.g. referred to as inter spectrum broker/controller) and/or a scheme is introduced that allows tracking spectrum sharing (e.g. LSA/ASA/CSS) based configuration possibilities and detects and prevents spectrum sharing configurations which lead to a malfunctioning system (e.g. due to malfunctioning mobile devices, unexpected cross-border issues, etc.).

Figure 4:
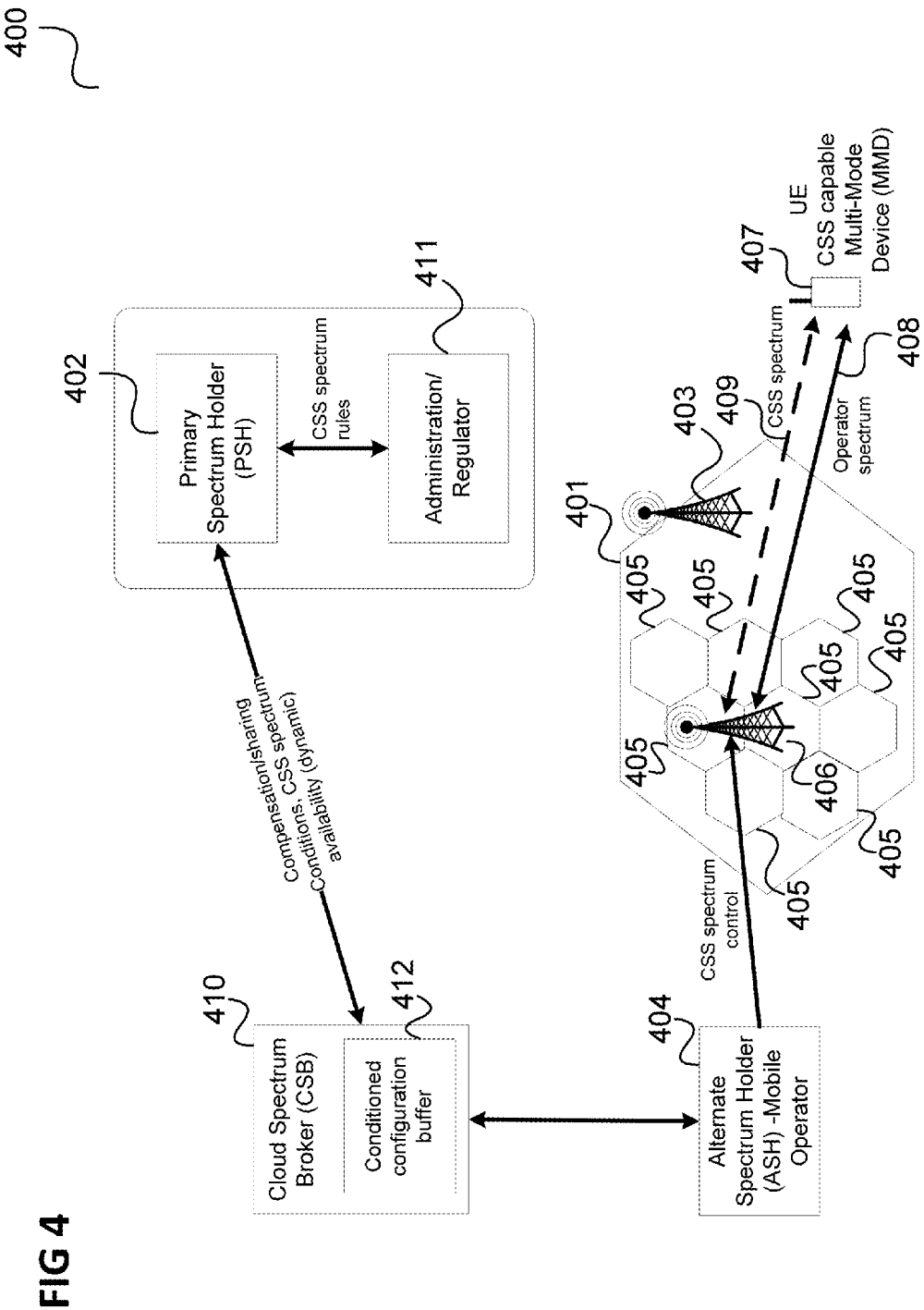
FIG. 4 shows a communication system.

This is illustrated in FIG. 4.

FIG. 4 shows a communication system 400.

In this example, in an area 401, a certain frequency spectrum is licensed by a primary spectrum holder (PSH) 402 and may for example be used by a transceiver (e.g. a base station 403).

In the area 401, an alternate spectrum holder (ASH) 404, e.g. a mobile network operator, operates a plurality of radio cells 405, e.g. corresponding to the radio cells 104, for example by one or more base stations 406, e.g. corresponding to the base stations 103.

A mobile terminal 407, e.g. corresponding to the mobile terminal 105, communicates via the base station 406. For example, for a certain first time period, the mobile terminal 407 uses the operator spectrum, i.e. the frequency spectrum licensed to the operator of the mobile network operator, for a communication connection 408 to the base station 406.

It is assumed that the communication system 400 is a communication system using a spectrum sharing concept, e.g. LSA, ASA or CSS. As an example, the spectrum sharing related functionalities and components are in the following referred to with CSS.

For example, the operator 404 may request permission to allocate CSS spectrum (i.e. spectrum available for sharing, in this case spectrum allocated to the PSH 402) such that the mobile terminal 407 may use the CSS spectrum for communication connections 409 to the base station 406 for a certain second time period. For example, the load in the radio cells 405 has increased (or is expected to increase for example since a certain event with a high number of visitors is planned) such that the operator spectrum is no longer sufficient for serving the mobile terminals in the radio cells 405 and the operator 404 therefore decides to request permission to use the CSS spectrum.

The PSH spectrum may also be unlicensed spectrum that is not licensed by any communication network operator. For example, it is spectrum that is sporadically used (e.g. by wireless cameras).

The PSH spectrum lies for example the spectrum of 2.3 GHz to 2.4 GHz (in Europe) or 3.55-3.65 GHz (in USA).

A spectrum broker/controller 410 decides whether the PSH spectrum is made available for mobile devices in the geographic area 401 for a given time. In this example, the spectrum broker/controller 410 is a cloud spectrum broker 410 since the communication system is assumed to use CSS. For LSA/ASA a similar may be provided although typically, the term "controller" is rather used instead of a "broker" in the context of LSA/ASA.

The spectrum broker/controller 410 may (dynamically) allocate PSH spectrum to the mobile communication network (or in other words the operator) such that it can be used by the base station 406 to serve the radio cells 405. The spectrum that the spectrum broker/controller 410 allocates to the mobile communication network can depend on the geographic location and it can be limited to be used within a given time interval.

Under what conditions the spectrum broker/controller may allocate the PSH's spectrum to the operator, e.g. at which geographic locations, for which time etc. and what the compensation is may be negotiated (dynamically) between the spectrum broker/controller 410 and the PSH 402. The PSH 402 may in turn consult an administration/regulator entity for spectrum sharing rules.

The spectrum sharing may give rise to a sequence of different spectrums allocated to mobile terminals served by the mobile communication network. For example, during a first time period, the mobile terminal 407 communicates via the first communication connection 408 using the operator spectrum and during a second time period, the mobile terminal 407 communicates via a second communication connection 409 using PSH spectrum allocated to the mobile communication network for (at least) that time period.

It should be noted that some time may lie between the communication connections 408, 409 (e.g. these are communication connections on different days) but they also belong to the same communication session (e.g. the same call and download), e.g. the second communication connection 409 may be a continuation of the first communication connection 408, e.g. may arise from a handover of the first communication connection 408 to the PSH spectrum. The communication connections 408, 409 may also be at least partially time wise in parallel.

In case that there is a dynamic allocation and de-allocation of possibly different PSH spectrums to the mobile communication network, complex spectrum sequences for the mobile terminal 407 (e.g. sequences of spectrums allocated to the mobile terminal 407) may be the result.

Figure 5:
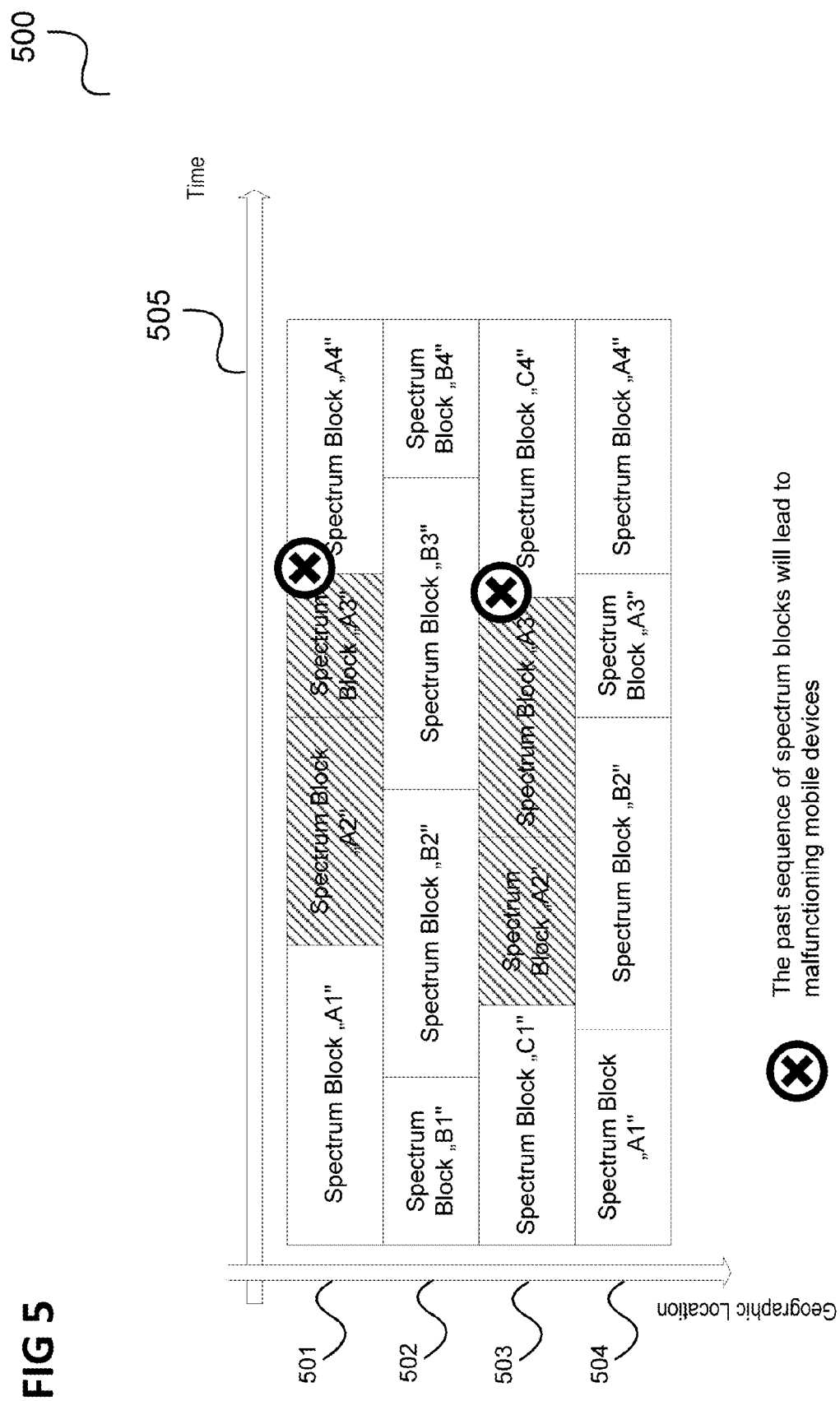
FIG. 5 shows a spectrum allocation diagram.

An example for a spectrum allocation sequence is given in FIG. 5.

FIG. 5 shows a spectrum allocation diagram 500.

The spectrum allocation diagram 500 shows the spectrum allocation (as allocation of spectrum blocks, e.g. certain bandwidths) at four geographic locations 501, 502, 503, 504 (e.g. corresponding to different radio cells 405 or also different groups of radio cells 405) in time along a time axis 505.

Since it is practically impossible that all possible spectrum allocation permutations (including their history) can be tested and validated for each mobile device type by lab testing, it can be expected that some (untested) configurations (e.g. spectrum sequences) may lead to some mobile device malfunctioning.

For example, the spectrum sequence A2, A3, i.e. the allocation of the spectrum A3 after the spectrum A2 may lead to a malfunctioning (indicated by the 'X' 506), e.g. a mobile device of a certain type using that spectrum allocation sequence.

In other words, the configuration (i.e. spectrum allocation) pattern as illustrated in FIG. 5 leads to undesired events such as interference or similar (e.g. due to a malfunctioning mobile device or any other malfunctioning network (management) entity).

It should be noted that during the allocation of a spectrum block and its usage by a mobile device, the mobile device has a certain configuration which may depend on the spectrum block (e.g. modulation scheme used, coding scheme used etc.), It may be possible that a given spectrum block may be used by mobile device with slightly different configurations (e.g. different modulation parameters, coding parameters) within a given air interface standard. This increases the complexity to the analyzing and avoiding of unexpected events (e.g. malfunctioning of devices) since a malfunctioning may occur only for mobile devices with a certain configuration for a certain spectrum sequence. This is illustrated in FIG. 6.

FIG. 6 shows a spectrum allocation diagram 600.

Similarly to the spectrum allocation diagram 500 of FIG. 5, the spectrum allocation diagram 600 shows the spectrum allocation (as allocation of spectrum blocks, e.g. certain bandwidths) at four geographic locations 601, 602, 603, 604 (e.g. corresponding to different radio cells 405 or also different groups of radio cells 405) in time along a time axis 605.

In the spectrum allocation diagram 600, for each spectrum block allocation, a spectrum allocation is indicated that a mobile device located in the respective geographic location and using the spectrum block allocation uses.

In this example, it is assumed that malfunctioning occurs for mobile devices for which the spectrum sequence A2, A3 is allocated and which have a configuration C-A 2 during the allocation of the spectrum block A2 and a configuration C-A3 during the allocation of the spectrum block A3 (as indicated by the 'X's 506, 507).

It should be noted that a certain spectrum sequence may arise for a mobile device not only due to a corresponding allocation of spectrum by the mobile communication network operator (as allowed by the spectrum controller/broker 410) but may also arise due to the mobile terminal crossing from one geographic location (e.g. one cell) at which a first spectrum is allocated for use to another geographic location (e.g. another cell) at which a second spectrum is allocated for use, e.g. when crossing a country border, such that for the mobile device, the sequence of the first spectrum followed by the second spectrum arises when travelling from the first geographic location to the second geographic location.

A malfunctioning of a mobile device (which may also be caused by the malfunctioning of a network (management) entity) may occur due to

- the allocation of a specific band (in a specific context, with specific radio parameters) which was not previously tested as such;
- due to a sequence of (e.g. LSA/ASA/CSS) dynamic spectrum allocation decisions (which could also result in a sequence of radio configurations that are untested);
- or other reasons (such as unexpected cross-border issues requiring complex political and administrative processes, etc).

It should be noted that in the more general case of a malfunction of a configuration in context of a configuration history, there may be many more reasons for a malfunction, e.g. software problems arising from a certain sequence of configurations, switching problems between RATs The malfunctioning of a mobile device (such as a cell phone, a laptop, a tablet etc.) may for example be detected by the base station 406, e.g. by detecting that a data stream communicated from the mobile device 407 to the base station 406 is interrupted or by detecting that the mobile device does not behave in accordance with the communication standard (such as LTE). Alternatively, the mobile device 407 may itself detect its own malfunctioning, i.e. based on a software exception, an error signal of one of its components (such as its RF transceiver) etc. and communicate its malfunction to the mobile communication network.

Malfunctioning of the mobile device 407 may for example be detected based on signal measurements (RF) within the device itself, or based on signal measurements from other mobile communication devices measuring their surroundings or detecting interference to increase inappropriately in proximity once the mobile communication device 407 starts transmitting or from the base station detecting inappropriate signals from the mobile communication device.

In view of spectrum sequences that lead to malfunctioning of mobile devices (e.g. certain types of mobile devices) the spectrum broker/controller 410 includes a memory 412, e.g. a conditioned configuration buffering entity.

For example, the memory (or buffer) 412 contains historical information about spectrum allocation and radio configurations which have been proven to work fine in a pre-defined framework (i.e. for a set of mobile devices, in a given geographic area in a given time, close to country borders, etc.).

The spectrum broker/controller (also referred to as cloud spectrum broker in CSS) grants spectrum access only to mobile device types for which the target configuration (i.e. the spectrum sequence that arises from the spectrum allocation) has been proven to work, e.g. for a predetermined amount of time $T_b$, without any malfunction occurring in the target mobile devices or any other malfunctioning network (management) entity. The predetermined time (or time period) may for example be set and then optimized by the spectrum broker/controller 410.

It should be noted that in a more advanced context, a two level spectrum broker/controller may be applied: A global spectrum broker/controller (in the "cloud", e.g. responsible for a plurality of communication networks) and one in the mobile communication network of the operator 404. The spectrum broker/controller may allocate spectrum to the individual subscriber devices of the mobile communication network.

The spectrum broker/controller 410 may also allow other mobile devices which have not yet being tested for the intended shared spectrum configuration (i.e. the spectrum sequence which arises from the spectrum allocation). In this case the shared spectrum configuration possibilities offered by the spectrum broker/controller 410 are buffered (i.e. in the memory 412) such that potential arising issues (i.e., malfunctioning mobile devices) can be traced back to specific spectrum configurations.

The memory 412 for example contains a set of spectrum sequences which are proven to work (i.e. not to cause malfunctioning) for all (or a number of) mobile device types. These set of spectrum sequences may for example be marked as to be used with preference.

When allocating spectrum to the mobile network operator 404 for a certain geographic area, the spectrum broker/controller 410 for example selects the most mature spectrum sequence (i.e. the spectrum sequence that has been used for the longest time without causing malfunctioning) in order to make sure that the probability of mobile device malfunctioning (or malfunctioning of any other malfunctioning network (management) entity) is as low as possible.

The spectrum broker/controller 410 may grant (i.e. allocate) a certain spectrum to the operator 404 to be used only for one or more certain mobile device types. In this case, for example, the spectrum broker/controller only buffers the spectrum configuration if it is granted to a mobile device type for which the spectrum configuration has not yet been validated, i.e. for which there it is not yet stored in the memory 412 that this spectrum configuration works correctly for this mobile device type.

The spectrum broker/controller 410 may monitor the functionality of the memory 412 and the extent of issues arising from malfunctioning mobile devices and may optimize the time $T_b$ to keep the occurrences of malfunctioning as little as possible.

The communication system 400 may include a plurality of spectrum broker/controllers 410 which may for example be responsible for different PSHs and ASHs. For example, a number of spectrum brokers/controllers may be available because a set of distributed databases are provided, a number of companies offer such a service, there are different broker/controller operators in different countries, etc.

In such a scenario, the spectrum broker/controllers 410 (and their memories 412) may interact in order to detect shared spectrum allocation sequences which lead to malfunctioning mobile devices.

This is illustrated in FIG. 7.

FIG. 7 shows a communication arrangement 700.

The communication arrangement 700 includes a first spectrum broker/controller 701 and a second spectrum broker/controller 702, each having a memory 703, 704 as described above with reference to FIG. 4.

The communication arrangement 700 further includes an inter spectrum broker/controller 705.

A single spectrum broker/controller 701, 702 may be able to identify a problem (e.g. a malfunctioning of a mobile device) but it may not be able to identify the precise shared spectrum allocation sequence that leads to the malfunctioning mobile device.

For example, the first spectrum broker/controller 701, as illustrated by a first spectrum allocation diagram 706 (corresponding to the top half of the spectrum allocation diagram 500 shown in FIG. 5), detects a malfunctioning of a mobile device which was allocated the spectrum sequence A1, A2, A3.

However, the first spectrum broker/controller 701 cannot track back the observed malfunctioning mobile device (or malfunctioning of any other malfunctioning network (management) entity) to a shared spectrum usage configuration. In this example, several possibilities may be the source of the problem:
 i) The concerned mobile device (or any other malfunctioning network (management) entity) is not compatible with the allocation of Spectrum Block A3,
 ii) The concerned mobile device or any other malfunctioning network (management) entity) is not compatible with the allocation of the sequence of spectrum blocks A2 and then A3,
 iii) The concerned mobile device or any other malfunctioning network (management) entity) is not compatible with the allocation of the sequence of spectrum blocks A1, then A2 and then A3, and so on.

The sharing of the information stored in the memories 703, 704 between the first spectrum broker/controller 701 and the second spectrum broker/controller 702 about the observations leading to malfunctioning of mobile devices may allow identifying the cause of the malfunctioning.

For example, as illustrated by a second spectrum allocation diagram 707 (corresponding to the bottom half of the spectrum allocation diagram 500 shown in FIG. 5), the second spectrum broker/controller 702 has observed the malfunctioning of a mobile device allocated the spectrum sequence C1, A2, A3.

The inter spectrum broker/controller 705 may compare observations regarding shared spectrum usage configurations and their associated parameters, including $T_b$.

For example, the observation of the malfunctioning by the first spectrum broker/controller 701 of a malfunctioning after a spectrum sequence A1, A2, A3 and the observation of the malfunctioning by the second spectrum broker/controller 702 of a malfunctioning after a spectrum sequence C1, A2, A3 are communicated to the inter spectrum broker/controller 705 which compares the observations (e.g. taken into account associated parameters such as mobile device type) and deduces that the spectrum sequence A2, A3 leads to a malfunctioning. The inter spectrum broker/controller 705 may store this spectrum sequence A2, A3 as an entry 708 in a memory with an indication that this spectrum sequence leads to a malfunctioning (e.g. for a certain type of mobile devices).

In this example the inter spectrum broker/controller 705 further deduces that the spectrum sequence B2, A3 leads to a malfunctioning, e.g. from the observation by the second spectrum broker/controller 707 and an earlier observation or an observation by a further spectrum broker/controller and stores this spectrum sequence as an entry 709 in a memory with an indication that this spectrum sequence leads to a malfunctioning (e.g. for a certain type of mobile devices).

The inter spectrum broker/controller 705 may communicate its findings (e.g. the entries 708, 709) back the spectrum broker/controllers 701, 702 such that the spectrum broker/controllers 701, 702 can take this information into account in the spectrum allocation.

It should be noted that the information about whether mobile communication devices operate correctly when a configuration is applied in a context of a configuration history to the mobile communication device may be stored in the mobile communication devices themselves.

For example, a mobile communication device 407 stores good configurations (i.e. without malfunction) and bad configurations (i.e. with malfunction) in context of certain configuration histories and on request, e.g. by the base station 405, indicates those configurations that can be used, those that cannot be used and/or those that are yet untested/unregistered and the base station or another network entity applies determines a configuration to be applied to the mobile communication device.

In the example of spectrum allocation as described above, the base station 405 for example requests spectrum (e.g. spectrum broker/controller 410) based on information received from the mobile communication device 407.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A method for device configuration comprising:
   storing information of whether a mobile communication system comprising a mobile communication device operates correctly when a configuration is applied to the mobile communication device based on a configuration history, wherein the configuration is intended to facilitate access, by the mobile communication device, to shared spectrum of a licensed shared access (LSA), an authorized shared access (ASA), or a cloud spectrum services (CSS) based system;
   receiving a request to apply a configuration to the mobile communication device; and
   determining a configuration to apply to the mobile communication device based on the stored information.

2. The method according to claim 1, wherein the information indicates whether a mobile communication system comprising a mobile communication device operates correctly when a configuration is applied in based on a configuration history of the mobile communication device for communication in the mobile communication system, wherein the configuration history indicates that the mobile communication device operated correctly for a predetermined period of time when the configuration was previously applied to the mobile communication device.

3. The method according to claim 1, comprising storing the information depending on a characteristic of the mobile communication device.

4. The method of claim 1, wherein the configuration comprises an allocation of a spectrum to the mobile communication device and wherein the configuration history comprises a past allocation of a spectrum to the mobile communication device.

5. The method of claim 4, wherein the information is whether the mobile communication system operates correctly when a first frequency spectrum and a second frequency spectrum are consecutively allocated to the mobile communication device.

6. The method according to claim 4, wherein the information indicates whether a mobile communication system comprising a mobile communication device operates correctly when the first frequency spectrum is allocated to the mobile communication device after the second frequency spectrum to the mobile communication device.

7. The method according to claim 4, wherein an allocation of a spectrum comprise an allocation of a spectrum in a predetermined geographic area after another spectrum that has been allocated in the predetermined geographic area and wherein the method comprises determining the spectrum such that according to the information, a mobile communication system operates correctly when the spectrum and the other spectrum are consecutively allocated to a mobile communication device of the mobile communication system.

8. The method according to claim 4, wherein the request is a request for a configuration to be applied to mobile communication devices in a predetermined geographic area and wherein the method comprises determining the spectrum such that according to the information, a mobile communication system operates correctly when the spectrum and another spectrum which is allocated for usage by the mobile communication device in another geographic area neighboring the predetermined geographic area are consecutively allocated to the mobile communication device of the mobile communication system.

9. The method according to claim 4, wherein the spectrum is an unlicensed spectrum.

10. The method according to claim 4, wherein the spectrum is shared between a primary user and a secondary user.

11. The method according to claim 4, wherein the spectrum is shared between a plurality of mobile communication systems.

12. The method according to claim 4, wherein the method comprises receiving a request for the spectrum from a mobile communication system and the request is a request to allocate a spectrum for usage by mobile communication devices of the mobile communication system and is a request for a spectrum that is not licensed by the operator of the mobile communication system.

13. The method according to claim 1, wherein the request indicates a candidate configuration to apply to mobile communication devices and determining a configuration comprises deciding whether to apply the candidate configuration.

14. The method according to claim 13, wherein the method further comprises, if it is determined to not apply the candidate configuration, determining to apply a configuration different from the candidate configuration.

15. The method according to claim 1, further comprising storing information that a mobile communication system comprising a mobile communication device operates correctly when the configuration is applied to the mobile communication device based on the configuration history when mobile communication devices have operated correctly the configuration has been applied to the mobile communication devices based on the configuration history since a predetermined point in time.

16. The method according to claim 1, further comprising applying the determined configuration to mobile communication devices.

17. The method of claim 1, wherein the request is a request to apply a configuration to mobile communication devices in a predetermined geographic area and determining the configuration comprises determining a configuration to apply to mobile communication devices in the predetermined geographic area based on the stored information.

18. A network entity comprising:
a receiver configured to receive a request to apply a configuration to mobile communication devices, wherein the configuration is intended to facilitate access, by the mobile communication devices, to shared spectrum of a licensed shared access (LSA), an authorized shared access (ASA), or a cloud spectrum services (CSS) based system; and
a determiner configured to determine information of whether a mobile communication system comprising a mobile communication device operates correctly when a configuration is applied to the mobile communication device based on a configuration history and configured to determine to apply a configuration for usage by the mobile communication devices based on the stored information.

19. The network entity of claim 18, wherein the determiner is configured to determine the information by requesting the information from a database.

20. One or more non-transitory computer-readable media having instructions that, when executed, cause a device to:
store a plurality of preferred sequences of shared spectrum resource allocation configurations, wherein individual preferred sequences of shared spectrum resource allocation configurations are associated with a history of a probability of a network entity malfunction, based on a respective shared spectrum resource allocation configuration, is below a predetermined threshold;
receive a request corresponding to a mobile communication device; and
allocate a shared spectrum resource allocation to the mobile communication device based on the stored plurality of preferred sequences of shared spectrum resource allocation configurations.

21. The one or more non-transitory computer-readable media of claim 20, wherein the instructions, when executed, further cause the device to:
monitor operation of a plurality of network entities to determine an occurrence of malfunctioning based on a shared spectrum resource allocation configuration.

* * * * *